N. WASHBURN.
CASTING CAR-WHEELS.
No. 181,504. Patented Aug. 22, 1876
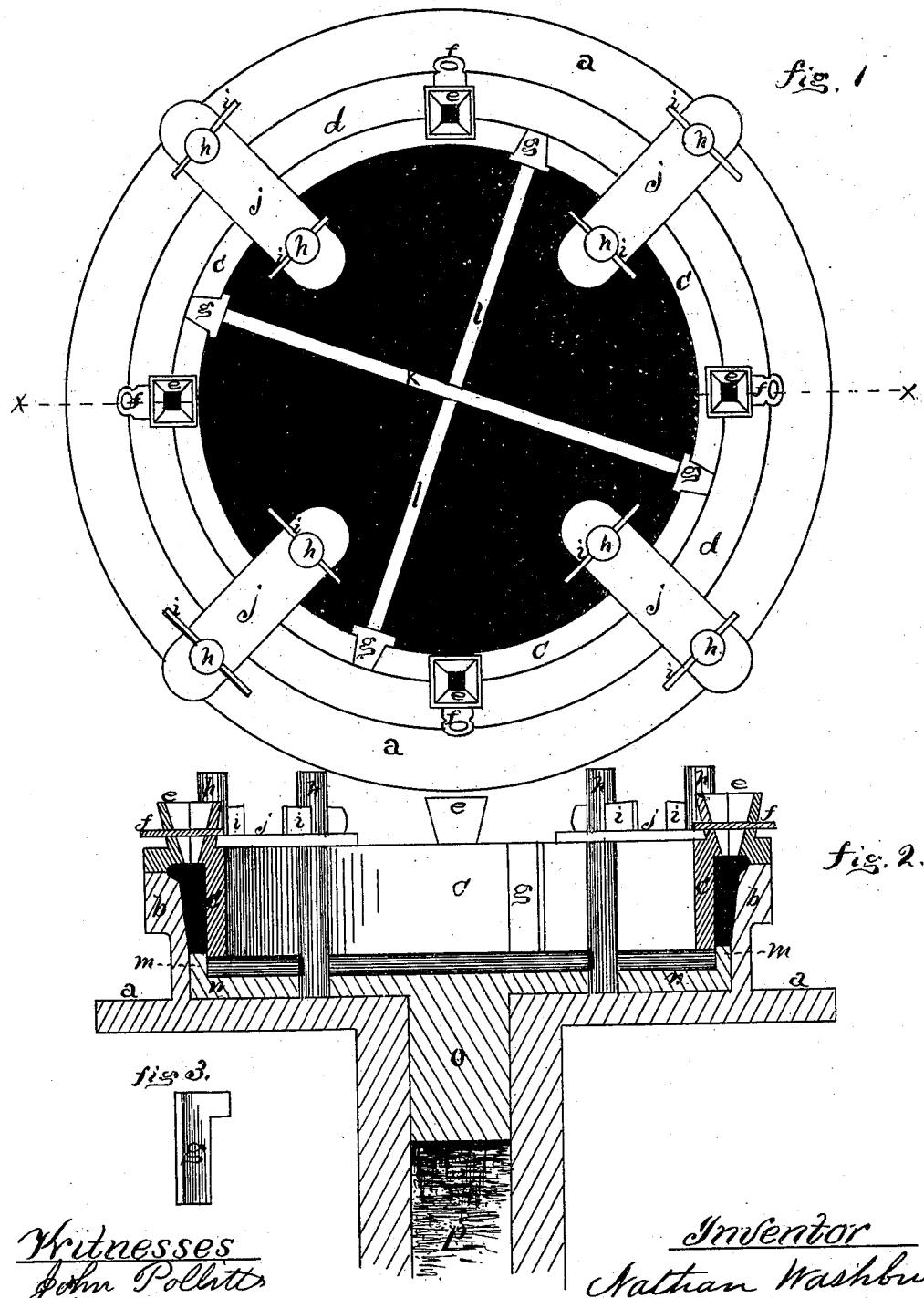
Witnesses
John Pollitt
Edw'd S. Bill
Inventor
Nathan Washburn
By W. E. Simonds
Att'y

UNITED STATES PATENT OFFICE.

NATHAN WASHBURN, OF HARTFORD, CONNECTICUT.

IMPROVEMENT IN CASTING CAR-WHEELS.

Specification forming part of Letters Patent No. 181,504, dated August 22, 1876; application filed August 30, 1875.

*To all whom it may concern:*

Be it known that I, NATHAN WASHBURN, of Hartford, in the county of Hartford and State of Connecticut, have invented certain new and useful Improvements Pertaining to the Art of Making Steel-Tired Car and Locomotive Wheels, of which the following is a specification, reference being had to the accompanying drawings, where—

Figure 1 is a top view of a mold made use of for producing the tire. Fig. 2 is a view of the same in transverse vertical section on the plane denoted by the dotted line $x$ $x$, the cross-bars $k$ $l$ $l$, hereinafter described. Fig. 3 is a side view of one of the key-stone wedges made use of in said mold.

This my present invention has for its object and purpose the production of car and locomotive wheels having bodies of cast-iron with tires of steel welded or fused thereto; and the invention consists in improvements in the art of producing the same.

The usual method of producing such wheels consists in first producing a hammered or rolled steel tire, heating it, placing it in a mold, the matrix of which is of the shape of a car-wheel, and then pouring the molten iron into the mold, which flows to and against the inside of the tire, and welds or fuses thereto. Afterward the steel tire has to be turned off round, and to permit this turning the steel has to be tolerably soft, which is a detriment to the durability of the wheel.

By my prevent invention I produce a steel tire, which, when first cast, is condensed and refined as thoroughly as can be done by subsequent hammering and rolling. Its outer shape is so true that it needs no turning off when fast on its cast-iron body. It is chilled when first cast, and, consequently, is very hard, and by transferring it from the mold wherein it is cast and condensed, while still hot, to the mold wherein its cast-iron body is cast to it I save the reheating of the steel tire, and avoid that oxidation of its surface which is the chief difficulty to overcome in the common process of casting the iron body, such oxidation, if not thoroughly removed, preventing a perfect weld between the steel tire and iron body.

I will first describe the means whereby I produce the steel tire.

The letter $a$ denotes a cast-iron base-plate; $b$, a cast-iron ring for forming the exterior of the tire; $c$ $c$ $c$ $c$, sections for forming the interior of the tire and a portion of one edge; $d$, a cap-ring for forming the main part of one edge of the tire; $e$ $e$ $e$ $e$, pouring-conduits; $f$ $f$ $f$ $f$, gates to these conduits; $g$ $g$ $g$ $g$, key-stone wedges to set the sections $c$ to place; $h$, rods rising from plate $a$, mortised near the top; $i$ $i$, &c., wedges entering said mortises; $j$ $j$, &c., clamp-plates, acted on by wedges $i$, to fasten the mold down; $k$, cross-bar to keep two of the wedges $g$ in place; $l$ $l$, cross-bars to keep the other two wedges $g$ $g$ in place; $m$, an annular follower borne on disk $n$; in turn borne on rod $o$, which rests on fluid in the hydraulic jack $p$.

The manner of using this mold is as follows: The parts being put together as shown in the drawings, the molten steel is poured into the conduits, the gates $f$ closed, and the hydraulic jack set to work to raise the annular follower, and so condense the metal till it is refined, free from blow-holes, homogeneous, tough, and tenacious. The metal is now cooled sufficiently to allow its being taken out of the mold, when the clamp-bars $j$ are taken off, the cross-bars $k$ $l$ $l$ knocked out, likewise the wedges $g$. The sections $c$ are removed, and the tire can be readily lifted from the mold. Still hot, it is immediately put into the mold, where it is to receive its cast-iron body, the matrix of which is of the shape of a car-wheel, and the molten iron is at once run into the body of the mold, filling it, and flowing against the inner side of the tire welds or fuses thereto.

By this means I get a wheel greatly superior in quality to those produced by former processes at a greatly cheapened rate. The tire as first produced is as well refined as if subsequently hammered or rolled. It is cast true to shape, so as to need no subsequent turning off. By being cast against the iron band $b$ it is chilled and made very hard. By its transfer while still hot to the mold, where it receives its cast-iron body, the cost of reheating is saved, and oxidation of the surface prevented, and by the retention of the cast nature of the tire its assimilation and union with the cast body is made more perfect.

The devices herein shown and described are also shown, described, and claimed in another application for patent by myself filed at the same date with this application.

I claim as my invention—

The process of making a wheel of iron or steel, consisting in first casting the tire, then removing it still hot to another mold, and then casting and welding the body thereto.

NATHAN WASHBURN.

Witnesses:
 WM. EDGAR SIMONDS,
 EDWARD S. BILL.